United States Patent [19]

Balasubramanian

[11] 4,158,503
[45] Jun. 19, 1979

[54] HETERODYNE OPTICAL CORRELATOR

[75] Inventor: N. Balasubramanian, Acton, Mass.

[73] Assignee: The United States of America as represented by the Secretary of the Army, Washington, D.C.

[21] Appl. No.: 838,288

[22] Filed: Sep. 30, 1977

[51] Int. Cl.$^2$ .............................................. G06K 9/08
[52] U.S. Cl. ............................... 356/71; 350/162 SF; 356/390
[58] Field of Search ........................... 356/2, 71, 109; 350/162 SF

[56] References Cited

U.S. PATENT DOCUMENTS

| | | | |
|---|---|---|---|
| 3,624,605 | 11/1971 | Aagard | 356/71 |
| 3,648,039 | 3/1972 | Kowalski | 356/2 |
| 3,749,492 | 7/1973 | Kawalski | 356/2 |

OTHER PUBLICATIONS

Balasubramanian et al. "Heterodyne Optical Correlation", *Photogrammetric Engineering and Remote Sensing*, vol. 42, No. 12 (Dec. 1976) pp. 1529–1537.

*Primary Examiner*—John K. Corbin
*Assistant Examiner*—R. A. Rosenberger
*Attorney, Agent, or Firm*—Thomas O. Maser

[57] ABSTRACT

A heterodyne optical correlator allows a correlation function to be computed for plural portions of a stereo pair of transparencies which is normalized to thus reduce the possibility of false correlation peaks. To obtain the correlation function, a pair of stereo transparencies are illuminated by an intense monochromatic light source producing an image at a common image plane in which a detector array is located. The relative path length, between source and transparencies, is periodically modulated producing at plural locations of the detector array plural alternating current signals representing the correlation between the amplitude transmittances at various corresponding locations on the transparencies for a given relative displacement between the transparencies. To normalize this correlation coefficient a second signal is produced by illuminating only one transparency and a corresponding third signal is produced by illuminating only the other transparency. The ratio between the correlation coefficient and twice the square root of the product of the second and third signals is a normalized correlation coefficient. Plotting the normalized correlation coefficient at each of the plurality of points in the transparencies as the relative positioning of the transparencies is shifted allows the correlation function and its peak to be determined. The relative positioning between the transparencies at the correlation peak is a measure of parallax.

11 Claims, 5 Drawing Figures

HETERODYNE OPTICAL CORRELATOR

BACKGROUND OF THE INVENTION

Stereo perception results from the detection of stereoscopic parallax and for photogrammetric data reduction is based on the measurement of this parallax difference from stereo photography. Automated measurement of stereoscopic parallax with photogrammetric instruments requires the ability to match corresponding images and the ability to measure the parallax automatically. This corresponding or conjugate image matching involves examination of the similarity of the image structures. One type of examination is image correlation. In general, the two dimensional function representing correlation of images on transparencies $T_1$ and $T_2$ has the form:

$$\rho 12(X_o, Y_o) = \int \int A\, T_1(X, Y)\, T_2(X + X_o, Y + Y_o) dx dy$$

where $T_1(X, Y)$ and $T_2(X, Y)$ are the intensity transmittances between the two transparencies and $X_0$ and $Y_0$ represent the relative displacement between the transparencies. Over the last several decades, many techniques of image matching using correlation have been proposed and demonstrated. For example, in automated electronic stereo compilation, the pictoral information is converted to time dependent electrical signals and the correlation is performed in the one-dimensional time domain; see *Manual of Photogrammetry*, American Society of Photogrammetry, edited by M. M. Thompson (1966), as well as Johnston U.S. Pat. No. 3,636,254 and Hobrough U.S. Pat. No. 3,432,674. Other prior art optical correlation techniques are disclosed in "Coherent Optics in Mapping" by Balasubramian and Leighty (ED) found in SPIE Proceedings, Volume 45 (1974).

Notwithstanding these prior art techniques, the need exists for a correlation system with increased signal to noise ratio, greater spatial resolution, and increased speed of operation. It is therefore an object of the present invention to provide such an optical correlation technique which, in addition to providing increased signal to noise ratio, greater spatial resolution, and increased speed of operation, as compared to other prior art correlation techniques, also:

(a) determines similarity between different regions on two transparencies in a common image plane which allows the two transparencies to be individually adjusted for changes in scale, tip and tilt during the projection process;

(b) provides a normalized correlation coefficient which is independent of the individual density levels of the two transparencies and therefore also avoids problems of spurious correlation peaks;

(c) detects correlation between two transparencies as an amplitude of a single frequency ac signal, thus improving the signal to noise ratio;

(d) provides a correlation output representing the correlation between the amplitude transmittance rather than intensity transmittance, thus increasing the effective dynamic range of the image structure information that can be employed during the correlation process;

(e) allows the transparencies to be employed on film rolls or plates;

(f) is capable of operating with only partially coherent light sources, i.e., an intense monochromatic light source is required and not a fully coherent light source; and (g) employs substantially a single imaging system with the corresponding ability to maintain geometric fidelity.

SUMMARY OF THE INVENTION

The invention, comprising a method and apparatus for the application of heterodyne optical correlation to conjugate image matching meets these and other objects. A normalized correlation coefficient is derived for a plurality of possible pairs of conjugate images on a stereo pair of transparencies as the relative positions of the stereo pair are varied. A plot of the normalized correlation coefficient versus stereo pair offset has a maximum for a conjugate image area at the offset equal to the parallax for the image area. The normalized correlation coefficient is derived by first aligning the stereo pairs in a path of monochromatic illumination and forming an image of each in a common image plane including an optical detector array. The relative optical path length from illumination source to the transparencies is varied or modulated, preferably in a linear fashion, as the detector array responses, at a frequency corresponding to the modulation rate, are stored for each of a plurality of offsets between the stereo pairs. Because the effective detector responses are ac single frequency signals, the signal to noise ratio is increased over prior art correlation techniques. The resulting stored signals comprise correlation coefficients for the various image areas corresponding to the various detectors in the array. Because of unavoidable variations between exposure conditions of the transparencies, the correlation coefficients as stored may have more than one peak and to eliminate potential ambiguity the correlation coefficients are normalized as follows. The stereo pairs are illuminated, by the same source, separately, and the respective detector responses are again stored for the same offsets. For each offset the stored correlation coefficient is divided by twice the square root of the product of the detector responses from each transparency, when illuminated alone. This processing removes the effect of different exposure levels for the different transparencies.

A generalized optical arrangement of the inventive apparatus consists of a two channel projector which projects an image of each transparency onto a common image plane using monochromatic light. The configuration of the system is illustrated in FIG. 1. In this arrangement transparencies $T_1$ and $T_2$ form the stereopair. The light source 10 illuminates the transparencies through the beam expander L1, L2. Channel 1 includes a mirror M2 which may be driven by a piezoelectric drive D in response to an oscillator 11. Light from M2 illuminates the transparency $T_2$ and is directed by an imaging lens LB2, through dc block 12 and beam splitter 32 onto an image plane 13, which includes a photodetector array 14. Likewise, illumination from the source 10 is directed by beam splitter B1, mirror M1, through the transparency $T_1$, imaging lens L31, dc block 15 and onto the same image plane 13. Let $t_1(x_1, y_1)$ be the amplitude transmittance of transparency T1. The coordinate system $(x_1, y_1)$ refers to the photocoordinates of transparency T1. Similarly, the amplitude transmittance of transparency $T_2$ is $T_2(x_2, y_2)$. The coordinate system $(x_2, y_2)$ refers to the photocoordinates of transparency $T_2$. In the final common image plane, the superimposed amplitude distribution is given by $$i(x,y) = t_1\left[\frac{x}{k_1}, \frac{y}{k_1}\right] + t_2\left[\frac{x}{k_2} + x_o, \frac{y}{k_2} y_o\right] \quad (2.1)$$

where
$k_1 x_1 = x$,
$k_1 y_1 = y$,
$k_2(x_2 - x_0) = x$,
$k_2(y_2 - y_0) = y$ $k_1$ and $k_2$ are magnification factors associated with the respective projector channel. In a very general case $k_1$ and $k_2$ can also be made dependent on $(x, y)$ (as in the case of rectifiers or anamorphic magnifiers) but for the purposes of this treatment $k_1$ and $k_2$ are assumed to be constant and equal to unity. Hence, equation (2.1) becomes $$i(x, y) = t_1(x, y) + t_2(x + x_0, y + y_0) \quad (2.2)$$

The photodetector 14 senses the intensity rather than the amplitude. The intensity distribution is given by the square of equation (2.2) as $$I(x, y) = |t_1(x, y)|^2 + |t_2(x + x_0, y + y_0)|^2 \quad (2.3)$$
$$+ 2t_1(x, y)t_2(x + x_0, y + y_0)\cos\frac{2\pi}{\lambda}\Delta(x, y)$$

where $\lambda$ is the wavelength of the light from source 10 and $\Delta(x, y)$ is the optical path difference between two beams. The third term in the above expression is an interaction term resulting from the monochromatic light illuminating the transparencies derived from a common source. The optical path difference $\Delta(x, y)$ can be made a time dependent function, by modulating the optical path length of channel 1. The optical path of channel 1 can be modulated in many ways. In one embodiment the mirror $M_2$ is moved by a piezoelectric drive D. Ideally the modulation function should be $$\Delta(x, y) = \Delta_0(x, y) + Vt$$

where V is a constant. Under this condition, the third term then represents a time varying intensity function, the frequency of the periodic function being given by $(V/\lambda)$. As described later the ultimate goal is to be able to measure the amplitude of the periodic intensity function, and this single frequency modulation permits easy measurement of this amplitude. However, in practice, it is difficult to realize a continuous linear modulation. The linear modulation condition can be simulated by driving the piezoelectric drive D with a triangular wave, whose period is long compared to the period of measurement, for example, eight times the measurement period. A parallel glass plate attached to an oscillating spindle such as a galvanoscanner placed in the path of the beam in channel 1 can also be used to produce modulation. When the modulation is not linear, suitable measurement techniques must be devised to determine the peak to peak value of the periodic intensity function.

When the optical path difference is modulated, the intensity distribution given by equation (2.3) becomes the time varying function.

$$I(x, y, t) = |t_1(x, y)|^2 + |t_2(x + x_0, y + y_0)|^2 \quad (2.4)$$

-continued
$$+ 2t_1(x, y)t_2(x + x_0, y + y_0)\cos\frac{2\pi}{\lambda}\Delta_0(x, y) + Vt)$$

The detector 14 has an aperture of area A and its output signal at any point P in the image plane is given by the integral $$S(P, t) = K\int\int_A I(x, y, t)dA \quad (2.5)$$

where K is a constant of proportionality dependent on the photodetector response. Substituting equation (2.4) into equation (2.5)

$$S(P, t) = K[\int\int_A |t_1(x, y)|^2 dA + \quad (2.6)$$
$$\int\int_A |t_2(x + x_0, y + y_0)|^2 dA$$
$$+ 2\int\int_A t_1(x, y)t_2(x + x_0,$$
$$y + y_0)\cos\frac{2\pi}{\lambda}(\Delta_0(x, y) + Vt)dA]$$

The first two terms of the above equation are dc signals while the third represents an ac signal at the frequency $(V/\lambda)$.

When the optical path difference $\Delta_0(x, y)$ is essentially constant over the aperture area A the ac part of the detector signal can be written as $$S_V(P, t) = 2K\cos\frac{2\pi}{\pi}(\Delta_0 + \quad (2.7)$$
$$Vt)\int\int_A t_1(x, y)t_2(x + x_0, y + y_0)dA$$

Hence, the ac part is a signal at frequency $V/\lambda$, having a phase of $\Delta_0$ and an amplitude $$S_V(P) = 2K\int\int_A t_1(x, y)t_2(x + x_0, y + y_0)dA \quad (2.8)$$

The expression of equation (2.8) represents the correlation between the two amplitude transmittances for the displacement $x_0$, $y_0$. Two additional measurements are necessary to normalize the above correlation function. When only transparency T1 is illuminated, the dc output of the detector is given by $$S_{02} = K\int\int_A |t_1(x, y)|^2 dA \quad (2.9)$$

Similarly, when transparency T2 is illuminated $$S_{01} = K\int\int_A |t_2(x, y)|^2 dA \quad (2.10)$$

With these three measurement values, the normalized correlation coefficient can be computed for a given $(x_0, y_0)$ separation between transparencies from $$C_{12}(x_0, y_0; P) = \quad (2.11)$$
$$\frac{\int\int_A t_1(x,y)t_2(x + x_0, y + y_0) dA}{[\int\int_A |t_1(x,y)|^2 dA \int\int_A |t_2(x + x_0, y + y_0)|^2 dA]^{\frac{1}{2}}}$$
$$= \frac{S_V(P)}{2[S_{01}S_{02}]^{\frac{1}{2}}}$$

The normalized correlation coefficient $C_{12}(x_0, y_0; P)$ has a maximum value of unity when $t_1(x, y)$ is a constant times $t_2(x+x_0, y+y_0)$ over the correlation area. Since $t_1$ and $t_2$ can differ within a multiplicative constant, it is seen that different exposure levels for the two transparencies are of no consequence.

In practice, the amplitude transmittance of the two transparencies can be represented as $$t_1(x, y) = t_{01} + t'_1(x, y)$$

and $$t_2(x, y) = t_{02} + t'_2(x, y)$$

where $t_{01}$ and $t_{02}$ represent the average transmittance and $t'_1(x, y)$ and $t'_2(x, y)$ represent image structure information. The presence of terms $t_{01}$ and $t_{02}$ do not affect the final value of the normalized correlation coefficient. However, the amplitude of the ac signal given by equation (2.8) becomes $$S_V(P) = \qquad (2.12)$$
$$2K \int \int_A [t_{01}t_{02} + t_{01}t'_2(x + x_o, y + y_o) + t_{02}t'_1(x, y)] dA +$$
$$2K \int \int_A t'_1(x, y) t'_2(x + x_o, y + y_o) dA = S_{VO}(P) + S'_V(P)$$

$S_{VO}(P)$ represent a constant amplitude ac signal and $S'_V(P)$ represents the correlation signal whose amplitude depends on the correlation between the two transparencies. In practice, the changes in $S'_V(P)$ are very small compared to the magnitude of $S_{VO}(P)$ and hence the measurement problem becomes complicated due to the limited dynamic range of the photodetector array to be used. This problem is overcome by putting dc blocks 12 and 15 at the back focal plane of the imaging lenses L32 and L31, as illustrated in FIG. 1. The dc blocks in effect remove the terms $t_{01}$ and $t_{02}$ and the amplitude of the ac signal directly represents the correlation amplitude.

The correlation signal amplitude is given by equation (2.8) as:

$$S_V(x_o, y_o; P) = 2K \int \int_A t_1(x,y) t_2(x + x_o, y + y_o) dA$$

Other correlation schemes have relied on the selection of the maximum value of $S_V(x_0, y_0; P)$ or its one-dimensional form to determine conjugate image coincidence at any point P. Unlike the normalized correlation coefficient $C_{12}(x_0, y_0; P)$, $S_V(x_0, y_0; P)$ has no unique maximum value and its value is dependent on the average transmittance of $t_1(x, y)$ and $t_2(x, y)$. Hence, the selection of a local maximum can lead to false correlation. This is one of the reasons why all the electronic correlation systems as well as some of the optical correlation systems rely on tracking to avoid ambiguity. Tracking always assumes that the conjugate images are always within the proximity of coincidence.

Theoretically, the normalized correlation function $c_{12}(x_0, y_0; P)$ monotonically decreases when the magnitude of the displacement vector $(x_0, y_0)$ is increased. The derivatives of the normalized correlation function depend upon image structure and the contrast of the image being correlated. The slope of the normalized correlation function also determines the accuracy of parallax measurement. By determining the displacement $(x_0, y_0)$ necessary to achieve a maximum value for the normalized correlation coefficient it is possible to determine the parallax difference associated with the image point P.

BRIEF DESCRIPTION OF THE DRAWINGS

The present invention will now be described in connection with the attached drawings in which like reference characters identify identical apparatus and in which.

DETAILED DESCRIPTION OF A PREFERRED EMBODIMENT

Figure 1:
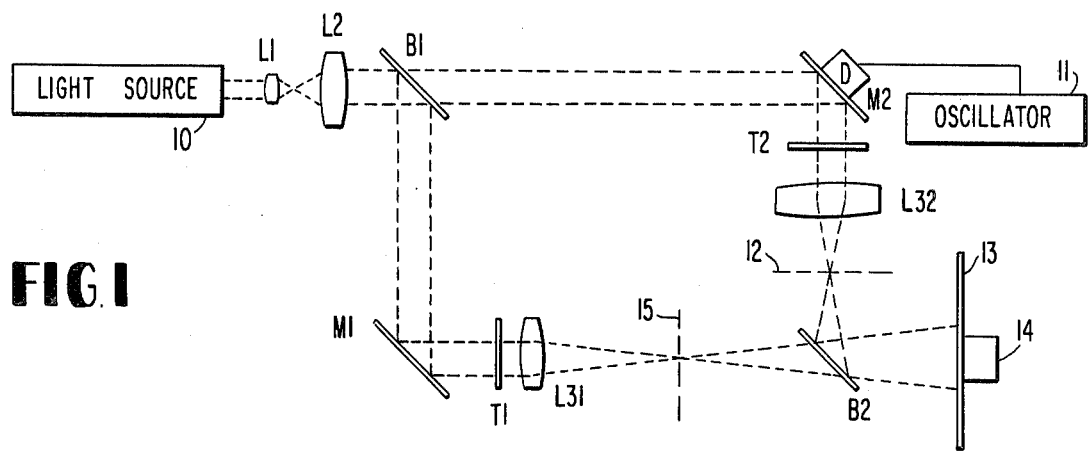
FIG. 1 is a schematic illustration useful in explaining the principles of the present invention.
Figure 2:
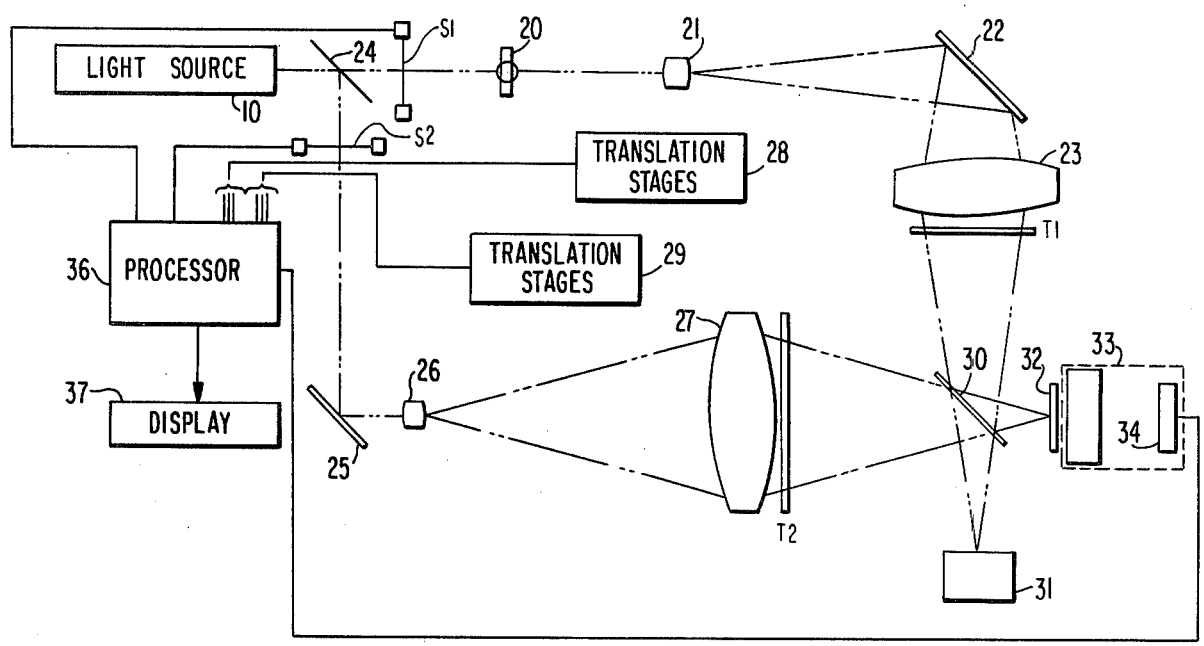
FIG. 2 is a schematic showing of a preferred embodiment of the inventive apparatus.

FIG. 2 is a schematic illustration of apparatus in accordance with the invention. As shown in FIG. 2, monochromatic light source 10, which may comprise a laser, provides optical energy to illuminate a pair of transparencies, transparency T1 and transparency T2. The output of light source 10 is split by beam splitter 24, and thence passes through a pair of shutters, shutter S1 and shutter S2, one in each of the paths of the illumination from the beam splitter 24. Adjacent shutter S1, and in the path of the illumination from the source 10 is a modulator 20 which is provided to modulate the path length between the light source 10 and the transparency T1. The illumination from modulator 20 is then expanded by beam expander 21 and reflected by a mirror 22 through condensing optics 23 where it impinges on the transparency T1. The light diffracted by the transparency T1 is reflected by a beam splitter 30 and passes through a dc block 32 wherein it is imaged on a detector array 33. The illumination path for transparency T2 is similar except that no modulator is provided in this path inasmuch as it is adequate to provide for relative changes in path length. The beam splitter 30 images the transparencies T1 and T2 onto the detector array 33 as well as onto the microscope 31 which can be employed for premeasurement alignment steps of the apparatus.

A processor 36 responds to the output of the array 33, makes the computations on the output of the array 33, and provides output data to display 37. Depending upon the user's requirements, the display 37 may provide information is graphical or tabular form. For example, a graphical form of output data would be available from a plotter or other graphical display device such as a CRT. Of course, if a transient type of output such as that provided by a CRT is employed, a camera can be arranged for permanently recording the output. For a tabular presentation of output, a conventional line printer can be employed.

Inasmuch as the optical and mechanical condition of the apparatus must be altered during the course of measurement, the processor 36, in accordance with its program, provides outputs to control the condition of shutter S1 and shutter S2. More particularly, at certain phases of the measurement process, the shutter S1 has to be closed and during other phases, the shutter S1 is open, similar remarks apply to shutter S2. The modulator 20 is continuously running to vary the path length from the light source to the transparency T1. In addition, once the apparatus has been aligned, and during the measurement process, the relative position of the transparencies must be changed and thus translation stages 28 and 29 are provided to effect this relative offset during the course of measurement and in between taking of measurements. Each of the translation stages allows the transparency to be moved in three degrees of freedom by means of a step motor for each direction of motion in accordance with signals provided from the processor 36. Furthermore, the translation stages 28 and 29 allow the transparencies to be rotated in a plane perpendicular to the optical axis for alignment purposes.

The optical components, including light source 10, beam splitters 24 and 30, mirrors 25 and 22, beam expanders 21 and 26, modulator 20, condensing optics 23 and 27, the transparency holders, microscope 31, dc block 32 and detector array 33 are rigidly mounted on a stable mechanical base. The optical components are mounted such that they lie perpendicular to the illumination path from light source 10.

In one embodiment of the invention, the modulator 20 comprises a 5×5×1 mm. glass plate attached to the spindle of a galvanoscanner (General Scanning G-100). The particular configuration of the modulator will be discussed in more detail with regard to FIG. 3. However, it is worthwhile to note that the oscillation of the glass plate in the path of the beam results in time modulating the optical path difference between the two beams. The optical path of each transparency includes a beam expander and a condenser. In one embodiment of the invention, the expander comprises a standard microscope objective (20×) and a spatial filter placed at its front focal point. The condenser, in the same embodiment, consists of a combination of two collimating objectives mounted back to back to minimize wave front distortion. In this embodiment, the objectives have focal lengths of 220 and 540 mm., and both lenses have a clear aperture diameter of 50 mm. The two transparencies T1 and T2 are mounted on holders or translation stages 28 and 29, and are placed as close as possible to the condensers. In the embodiment being referred to, the illumination area on the transparency had a clear area of 40 mm. A final imaging lens (included in front of detector array 33 was 85 mm./f 2.8) produces superimposed images of the transparencies at the common image plane occupied by the detector array. The final beam splitter may be formed by cementing together two identical plane parallel glass plates with the beam splitter coating at the cemented surface. The symmetric nature of the final beam splitter assures that any aberration has the same effect on both images and therefore produces little effect on the correlation value. The dc block was, in one embodiment, a circular opaque spot (0.25 mm. in diameter) formed with India ink on a microscope slide, placed at the point of convergency of the illuminating beam. Similar to the final beam splitter, the dc block is located between the final beam splitter and the imaging lens and therefore is common to both paths. The other output path of the final beam splitter is directed to the microscope 31 which is therefore subjected to a similar superimposed image of the transparencies. Visual examination of the common image plane through the microscope permits manual relative orientation of the two transparencies for alignment purposes before measurement begins.

In accordance with equation (2.7) the optical path difference between the two beams over the individual detector aperture must be a constant. To satisfy this condition, in practice, the fringe spacing must be at least 5 times the lateral extent of the elemental detector in the array. This determines the required quality of the condenser optics and mirrors. Tests have indicated that the available tolerances can be achieved with condenser optics and mirrors having tolerances of about a quarter of a wave thus making available remaining tolerance for variations in the phase transmission of the transparency. This tolerance can be achieved by using most glass film plates, and even some with flexible substrates.

In the referred-to embodiment, the final lens contained in the array 33 employed a nominal reduction of about 5. In this embodiment, the individual detector element was 90×60 micrometers, and thus with the final lens reduction, the correlation at the transparency corresponded to 450×350 micrometers.

Each of the transparencies is mounted in a plate holder with a plane steel reference surface. Each holder is mounted on a three axis translation stage, each axis being controlled independently by a stepping motor in response to signals from the processor 36. In the referred-to embodiment, resolution of about 3 micrometers for each stage appears adequate. In addition, the plate holder can be rotated about the optical axis in its own plane.

The array, in one embodiment of the invention, was a 32×32 RETICON array, although larger arrays could well be employed. As illustrated in FIG. 2, the array is interfaced directly to the processor 36 so that the output of each element can be read sequentially. In the same embodiment referred to, the processor employed a 200 kHz. clock rate providing an integration time of 5.12 milliseconds. The shutters S1 and S2 (Vincent Associates) are operated directly by the processor 36 and each have a response time of about 5 milliseconds. The various translation stages of the transparency mounts are independently controlled by the processor. The galvanoscanner modulator 20, on the other hand, is driven by an independent signal source (not illustrated) and is not controlled by the processor.

Figure 3:
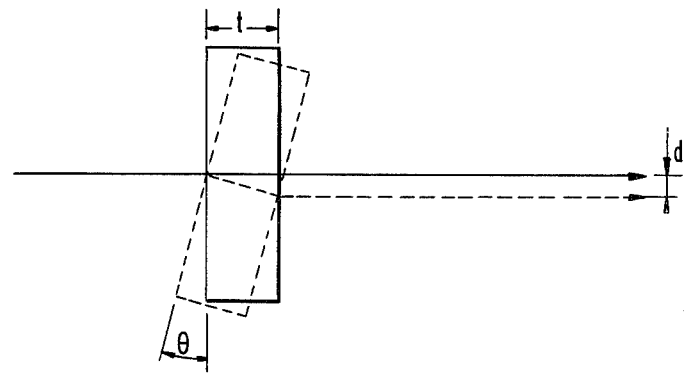
FIG. 3 is a detail showing a preferred modulator 20.

In the embodiment shown in FIG. 2, the path length modulator 20 comprises a rotating glass plate with parallel faces having a thickness on the order of 1 mm. The glass plate is attached to the spindle of the galvanoscanner, oscillates the angle the plate makes with the illumination beam resulting in a time modulation of the optical path length for one path. Since the other path includes no modulator, the changes in path length comprise a relative change in path length. FIG. 3 illustrates the glass plate having a thickness t and making an angle $\theta$ with a normal to the direction of the illumination beam. The optical path difference, i.e., the difference between path lengths and the two optical paths caused by the modulator 20, can be expressed $nt/\cos\theta/n-1$, where n is the refractive index of the glass, t is the thickness of the glass plate and $\theta$ is the angle shown in FIG. 3. For good detection purposes, the maximum path length difference required is about twice the wavelength of the illumination. With n=1.5, and the wavelength of $0.6328 \times 10^{-3}$ mm., the maximum angle $\theta$ necessary is 2.5°. As also illustrated in FIG. 3, rotation of the glass plate in order to modulate the path length introduces a lateral displacement d to the beam. However, employing the parameters previously referred to, this lateral displacement is 0.044 mm. and can be ignored.

OPERATION

Before the device can be employed, it must be initialized. This is achieved by insuring that the illumination is parallel to the base of the instrument and the transparency plate holders are perpendicular to the base and thus perpendicular to the illumination beam. The detector array 33 is aligned so that its face is perpendicular to the optical axis of the instrument. Likewise, the microscope 31 must be aligned so that it is perpendicular to the optical axis. The array and microscope axes are aligned to be parallel to the axes of the transparencies on the holders.

Since correlation and image matching is done in the detector array plane, while parallax measurement is made at the plane of the transparency, differences in reduction scales of the two transparencies at the detector array produces errors in parallax measurement. Therefore, it is important that the projection scale be measured accurately. For this purpose, translation of the transparencies parallel to the optical axis are employed to produce small changes in scale, so long as the transparency remains within the depth of field. By moving the transparencies in x and y directions at a given distance along with optical axis, note can be taken of the scale difference and thus the system can be calibrated to provide the scale factor of any distance along the optical axis within the depth of field.

Once the foregoing is accomplished, the relative orientation of the transparencies is accomplished to align the individual transparencies with each other and the orientation of the parallax axis with the x axis of the translation stage. This is achieved by using control points on the transparencies that lie along a normal parallel axis. This may be accomplished using white light illumination and rotating the transparency until the axis is parallel to the x axis translation stage by viewing the image with the microscope. This is accomplished for both transparencies.

Once the relative orientation of the stereo transparencies has been achieved, the starting point for the actual measurement or compilation procedure is the adjustment of one of the moveable transparencies to represent conjugate image coincidence in a chosen datum plane; this assures x and y axes translation along one direction. With this step, the operation with white light terminates and the intense monochromatic source 10 illustrated in the drawings is used for the actual measurements.

During the measuring process, for any given orientation of the two images, the normalized correlation coefficient is determined for each element in the array. To accomplish this, the measurements corresponding to equations (2.9) and (2.10) are first accomplished for each individual transparency by measuring the intensity distribution over the image plane from each channel when the other channel is blocked by the corresponding shutter. With these values stored in two different matrices (i.e., a dedicated area in processor memory) the modulation intensity of equation (2.8) is determined. These measurements are under the control of the processor 36.

More particularly, first with one shutter closed, the output of each element in the array is read and stored. To improve the signal to noise ratio, the average readings of several frames are made. The number of frames to be averaged is optimized against the required speed of measurement. The same procedure is then repeated with the first shutter closed and the second shutter opened. Finally, the modulated intensity term is determined with shutters in both channels open. Because of the interference between the two beams, the intensity distribution of the image plane is time modulated at the frequency determined by the modulator 20. During this measurement, the output of the array is read sequentially over several frames. The reading rate is selected so that multiple (for example 8) samples are read between one maximum and the related minimum in path length. The first reading for each element in the array is stored in two locations in memory, one which will represent minimum intensity and the other which will represent maximum intensity. The output of subsequent frames are compared to minimum and maximum stored values for the corresponding element and any necessary changes are made, i.e., if a new value is greater than the previously stored maximum, the previously stored maximum is changed to the new value read, with similar actions occurring for minimum values. After a large number of frames, compared to the frequency of modulation, the differences between the stored maximum and minimums provide the amplitude defined by equation (2.8) for each element in the array. Increasing the number of frames read decreases the uncertainty in the measurement, but again, this must be optimized against the required speed of operation. At this point, memory contains the amplitude term of equation (2.8), i.e., the difference between the maximum and minimum values, for each element in the array, as well as the terms corresponding to equations (2.9) and (2.10). Taking the ratio of (2.11) then gives a normalized correlation coefficient for each detector in the array for the relative position of the transparencies.

The next step in the operation is to introduce an x step, i.e., the x translation stage of one transparency is incremented in a selected direction by a given parallax amount and the process is then repeated. At the conclusion, a second array of values is obtained for the normalized correlation coefficient for each detector in the array at this new relative positioning. Further x parallel steps are introduced and similar operation ensues. After a given number of x parallax steps, the x stage is returned to its original position and a y parallax step is introduced. The various x parallax steps are now repeated for the new y parallax position. The total number of steps taken is the number of x parallax steps times the number of y parallax steps. At the conclusion, data values are available for each detector in the array corresponding to the normalized correlation coefficient at each of the various relative positionings during which measurement takes place. This can be conceived of as a three-dimensional matrix such as that shown in FIG. 4. By scanning this data, it is possible to determine, for any given element in the array, at what x and y step the normalized correlation coefficient is a maximum. The x and y steps values at which the image matching is a maximum becomes the x and y parallax values for the correlation area corresponding to that element on the reference transparency. Thus, the final output of the processor 36 is the two two-dimensional matrices of x and y parallax values representing each elemental area defined by the array as shown by FIG. 5.

Figures 4, 5:
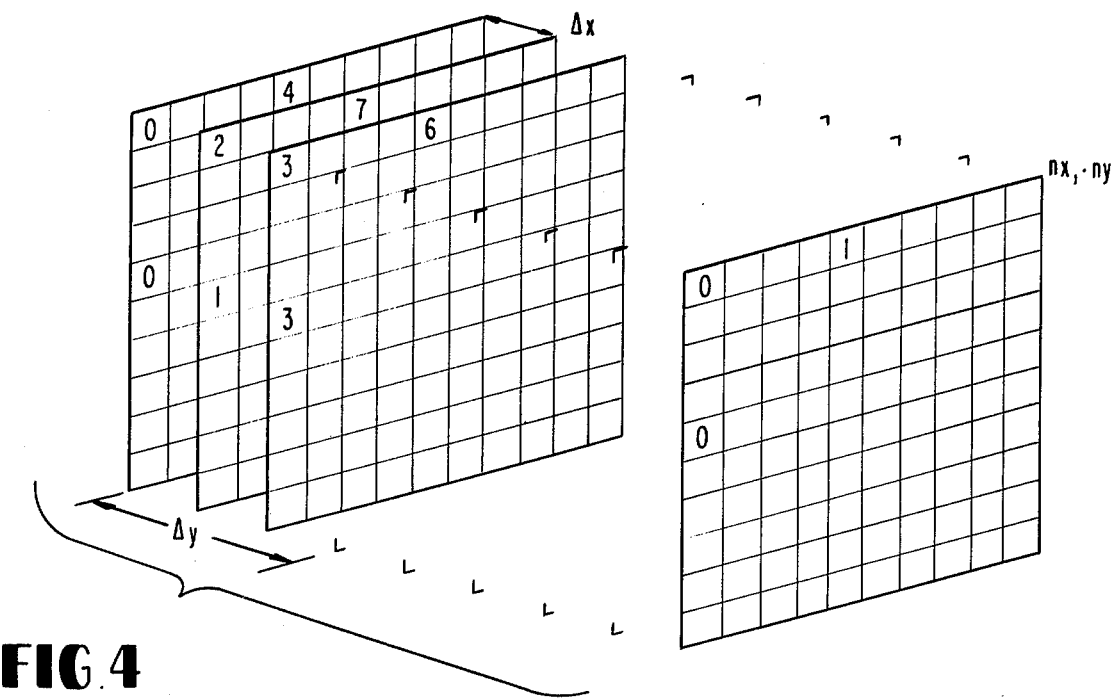
FIG. 4 is useful in explaining the data collection and organization.
FIG. 5 illustrates the form of the final output.

In order to conserve processor memory space, the processing can be arranged such that the data of FIG. 4 is actually never stored. For any given x and y parallax position, the measurement sequence provides 3 parameters for each element of the array, these are the x and y parallax steps and the corresponding normalized correlation coefficient. This value for the normalized correlation coefficient can be compared with the previous stored value for the corresponding array element and only the parameters corresponding to the maximum correlation coefficient value are stored. Thus, at the conclusion of the process the two two-dimensional matrices of FIG. 5 are retained in the processor memory and can be outputted in any desired form. Thus, the FIG. 5 data can be outputted on a printer, plotter, etc.

One further precaution must be taken. If there is insufficient image structure present within the correlation area of either of the transparencies, the image intensity measurement (i.e., the measurement corresponding to the value of equations (2.9) or (2.10)) will be smaller due to the presence of the dc block in front of the imaging lens. Image structure is necessary to diffract light around the dc block in the filter. To avoid ambiguous correlation due to noise, in such cases, a condition on the minimum value for intensity measurements can be imposed. Thus, only measurements greater than this threshold are considered for further computation of a correlation coefficient for that particular element at that particular parallax position. For those measurements which fail this test, 0 can be inserted in the output.

While this description has been in terms of employing the apparatus and methods of the invention to determine x and y parallax steps for given areas on a stereo pair, other utilities for the method and apparatus are available. For example, the invention can be used as a pre-scanner for other mapping systems. For example, if the slope of a normalized correlation coefficient as a function of displacement is large, which characteristic can be determined during the measurement process, the size of the parallax steps at least in the area of large correlation coefficient slope can be decreased to achieve increased accuracy.

While the preceding discussion refers to a processor 36, which, in one embodiment was a commercially available minicomputer, the use of such apparatus is not essential. Those skilled in the art will understand that a commercially available microprocessor could also be used. Indeed, similar functions could also be performed by a specially designed electronic control system. The design of such system will be apparent from a reading of this description and any further disclosure is deemed unnecessary. The term processor, as employed in the claims, shall refer to any apparatus that is capable of performing the functions set forth, in accordance with the preceding discussion.

What is claimed is:

1. A method for determining parallax by deriving a correlation coefficient responsive to amplitude transmittance of images on a transparency stereo pair with increased signal to noise ratio comprising the steps of:
   (a) illuminating said stereo pair with at least common intense monochromatic illumination and forming an image of each in a common image plane,
   (b) simultaneously with step (a) linearly modulating the optical path length at a time rate from source to one of said transparencies,
   (c) detecting responses from an optical detector in said common image plane occurring at a frequency $V/\lambda$ wherein $\lambda$ is the wavelength of said illumination and V is said modulation rate, and
   (d) repeating steps a–c for various relative positions of said transparencies and determining parallax by the relative offset resulting in maximum coefficient value.

2. A method of determining parallax by deriving a correlation coefficient responsive to amplitude transmittance of images on a transparency stereo pair with increased signal to noise ratio comprising the steps of:
   (a) illuminating said stereo pair with at least common intense monochromatic illumination and forming an image of each in a common image plane,
   (b) simultaneously with step a linearly modulating the optical path length at a time rate from source to one of said transparencies,
   (c) detecting responses from an optical detector in said common image plane occurring at a frequency $V/\lambda$ wherein $\lambda$ is the wavelength of said illumination and V is said modulation rate,
   (d) separately illuminating first one and then the other said transparency,
   (e) separately detecting responses from said optical detector $D_1$ and $D_2$ corresponding to said separate detection,
   (f) dividing said coefficient by $2\sqrt{D_1 D_2}$, and
   (g) repeating steps a–f for various relative positions of said transparencies and determining parallax by the relative offset resulting in maximum value of the normalized coefficient.

3. The method of claim 2 in which said step (d) is repeated a plurality of times between minimum and maximum path length condition.

4. The method of claim 2 in which plural normalized coefficients are derived for plural corresponding portions of said transparencies in which said optical detector includes plural separate optical detectors and in said steps (c) and (e) include detecting a response from each said separate detector.

5. A method of optical image correlation to determine parallax between images on a first and second transparent optical record which reduces the risk of detecting false correlation peaks by computing a normalized correlation function comprising the steps of:
   (a) illuminating said first transparent optical record by an intense optical source to create a first image on a detector array,
   (b) recording detector array responses to create a first stored signal array $D_1$ related to said first image,
   (c) illuminating said second transparent optical record by said source to create a second image on said detector array,
   (d) recording detector array responses to create a second stored signal array $D_2$ related to said second image,
   (e) concurrently illuminating said first and second transparent optical records by said source to create a third image on said detector array,
   (f) modulating relative path length from said source through said records concurrent with performance of step (e),
   (g) recording detector array response to illumination of step (e) to create a third recorded signal array $D_3$,
   (h) computing $D_3/2(D_1 D_2)^{\frac{1}{2}}$, and
   (i) repeating steps a–h at different relative positions of said records,
whereby a maximum value of $D_3/2\sqrt{D_1 D_2}$ corresponds to a correlation peak and relative positioning of first and second records resulting in said maximum value determines parallax.

6. Apparatus for deriving correlation coefficients responsive to amplitude transmittance of images on a transparency stereo pair with improved signal to noise ratio and in which the coefficients derived are normalized to remove errors caused by disimilar exposure levels of said transparencies comprising:
   a source of intense monochromatic illumination and a beam splitter in a path of said illumination to produce two illumination beams, a pair of holders for said transparencies supporting said transparencies within and perpendicular to said illumination beams from said source, a path length modulator for repetitively changing path length from said source to one of said transparencies at a rate V, an imaging system for producing an image of each said transparency in a common image plane, an optical detector in said common image plane, means for recording responses of said detector occuring at a frequency $V/\lambda$ where $\lambda$ is the wavelength of said illumination, a dc block located adjacent said common image plane, a pair of shutters, each associated with one of said transparencies to control illumination incident thereon, and wherein said optical detector comprises an array of detectors, said means for recording including programmed means to:

(a) open one of said shutters and record a first response array $D_1$ with said other shutter closed, (b) open said other shutter and close said first shutter and record a second response array $D_2$, (c) record said detector responses $D_3$ with both said shutters open, and (d) compute $D_3/2\sqrt{D_1 D_2}$ 7. The apparatus of claim 6 which further derives parallax in which said holders include means for moving at least one said transparency relative to said other and in which said programmed means operates said means for moving to provide plural relative positions for said transparencies and to compute said quantity $D_3/2\sqrt{D_1 D_2}$ for said plural relative positions of said transparencies.

8. Apparatus for locating conjugate images and related parallax as a function of amplitude transmittance of a stereo pair of transparent optical records comprising:

a source of intense monochromatic optical energy, a pair of optical record holders displaced from one another, each with at least two degrees of freedom, each located to allow illumination by said source of records in said holder, an imaging system to produce an image of each record in a common image plane when each record is illuminated by said source, a pair of shutter means each associated with one of said holders to control incident optical energy on a record on said holder, an optical detector array in said image plane, an optical path length modulator means located between said source and one of said record holders for varying optical path length between said source and a record in said one record holder, between minimum and maximum path length, means for controlling said pair of shutter means and positioning of said record holders, said means including storage means coupled to said detector array and processor means for addressing said storage means and controlling said shutter means, said processor means first opening one of said shutter means and storing an array $D_1$ of responses from said detector array, said processor means also opening another of said shutter means and storing an array $D_2$ of responses from said detector array, said processor means further opening both said shutter means and storing an array $D_3$ of detector array responses and computing $D_3/2\sqrt{D_1 D_2}$ for each element of said detector, said processor means controlling said record holders to introduce a controlled relative displacement and again controlling said shutters to store further arrays $D'_1$, $D'_2$ and $D'_3$ and computing $D'_3/2\sqrt{D'_1 D'_2}$.

9. The apparatus of claim 8 in which said modulation is linear in time with a rate V, and in which said $D_3$ array of responses changes with frequency $V/\lambda$ wherein $\lambda$ is wavelength of said monochromatic illumination.

10. The apparatus of claim 9 in which said modulator comprises a galvanoscanner oscillating a plate in the path of illumination of one of said transparencies.

11. The apparatus of claim 9 in which said modulator comprises an ocillating mirror and piezoelectric drive therefor.

* * * * *